(12) United States Patent
Remacha et al.

(10) Patent No.: US 8,641,896 B2
(45) Date of Patent: Feb. 4, 2014

(54) FILTER DEVICE, IN PARTICULAR FLUID FILTER, WITH A HEATER

(75) Inventors: Carlos J. Blasco Remacha, Azuqueca de Henares (ES); Cesar Garcia Benitez, Madrid (ES); Juan Luis Marquez Gavilan, Cordova (ES)

(73) Assignee: Robert Bosch GmbH, Stuttgart (DE)

( * ) Notice: Subject to any disclaimer, the term of this patent is extended or adjusted under 35 U.S.C. 154(b) by 515 days.

(21) Appl. No.: 12/025,370

(22) Filed: Feb. 4, 2008

(65) Prior Publication Data
US 2008/0197064 A1 Aug. 21, 2008

(30) Foreign Application Priority Data
Feb. 6, 2007 (DE) .................. 10 2007 005 771

(51) Int. Cl.
*B01D 35/18* (2006.01)
*F02M 37/22* (2006.01)

(52) U.S. Cl.
USPC ...................................................... 210/184

(58) Field of Classification Search
None
See application file for complete search history.

(56) References Cited

U.S. PATENT DOCUMENTS

| | | | |
|---|---|---|---|
| 1,455,287 A * | 5/1923 | Hadley | 219/528 |
| 1,523,156 A * | 1/1925 | Adams | 392/479 |
| 1,695,227 A * | 12/1928 | Bolinger | 392/479 |
| 1,766,480 A * | 6/1930 | Blauvelt | 392/493 |
| 2,103,434 A * | 12/1937 | Pennebaker | 210/185 |
| 2,482,665 A * | 9/1949 | Geyer | 219/529 |
| 2,527,864 A * | 10/1950 | Weidenschilling | 219/535 |
| 2,529,698 A * | 11/1950 | Julius | 210/149 |
| 2,553,762 A * | 5/1951 | Gyuris | 338/232 |
| 4,338,189 A * | 7/1982 | Johnson, Sr. | 210/180 |
| 4,406,785 A * | 9/1983 | Siefer | 210/186 |
| 4,437,986 A * | 3/1984 | Hutchins et al. | 210/130 |
| 4,470,301 A * | 9/1984 | Hutchins et al. | 73/304 R |
| 4,473,054 A * | 9/1984 | Marcoux et al. | 123/557 |
| 4,479,477 A * | 10/1984 | Manchester | 123/557 |
| 4,498,446 A * | 2/1985 | Judson | 123/557 |
| 4,522,712 A * | 6/1985 | Fischer et al. | 210/86 |
| 4,539,108 A * | 9/1985 | Izutani et al. | 210/104 |
| 4,596,224 A * | 6/1986 | Prager | 123/557 |
| 4,603,244 A * | 7/1986 | Genz | 219/205 |
| 4,664,088 A * | 5/1987 | Cantoni | 123/557 |
| 4,818,842 A * | 4/1989 | Walty | 219/205 |
| 4,844,793 A * | 7/1989 | Izutani et al. | 210/97 |
| 4,861,966 A * | 8/1989 | Matthiesen et al. | 219/205 |
| 4,866,250 A * | 9/1989 | Pasbrig | 392/479 |
| 6,177,658 B1 * | 1/2001 | White et al. | 219/535 |
| 6,328,883 B1 * | 12/2001 | Jensen | 210/136 |
| 6,974,537 B2 * | 12/2005 | Abdelqader | 210/86 |
| 7,396,473 B1 * | 7/2008 | Guynn | 210/774 |
| 8,038,872 B2 * | 10/2011 | Jokschas et al. | 210/86 |
| 8,057,687 B2 * | 11/2011 | Jainek | 210/767 |
| 8,231,779 B2 * | 7/2012 | Jokschas et al. | 210/86 |

(Continued)

FOREIGN PATENT DOCUMENTS

DE 10 2008 043 197 A1 * 4/2010
DE 102008043197 A1 * 4/2010 ............ B01D 35/18
WO WO 2007/020179 A1 * 2/2007

*Primary Examiner* — Robert James Popovics
(74) *Attorney, Agent, or Firm* — Maginot, Moore & Beck

(57) ABSTRACT

Disclosed is a filter device having a filter element disposed in a filter housing and a heater for heating a medium flowing through the filter device. The heater is disposed in the interior of the filter housing and is mounted on the filter element.

23 Claims, 4 Drawing Sheets

(56) References Cited

U.S. PATENT DOCUMENTS

| | | | |
|---|---|---|---|
| 8,282,819 B2* | 10/2012 | Parra Navarrete et al. | 210/184 |
| 2005/0103728 A1* | 5/2005 | Abdelqader | 210/774 |
| 2006/0249499 A1* | 11/2006 | Winkler | 219/202 |
| 2008/0037967 A1* | 2/2008 | Fasold et al. | 392/451 |
| 2008/0197064 A1* | 8/2008 | Blasco Remacha et al. | 210/184 |
| 2008/0296288 A1* | 12/2008 | Girondi | 219/552 |
| 2009/0126705 A1* | 5/2009 | Trapasso et al. | 123/549 |
| 2010/0193505 A1* | 8/2010 | Peck | 219/548 |
| 2010/0200485 A1* | 8/2010 | Parra Navarrete et al. | 210/184 |
| 2010/0258491 A1* | 10/2010 | Jokschas et al. | 210/181 |
| 2012/0037548 A1* | 2/2012 | Jokschas et al. | 210/86 |

* cited by examiner

FILTER DEVICE, IN PARTICULAR FLUID FILTER, WITH A HEATER

REFERENCE TO FOREIGN PATENT APPLICATION

This application is based on German Patent Application No. 10 2007 005 771.9 filed 6 Feb. 2007, upon which priority is claimed.

BACKGROUND OF THE INVENTION

1. Field of the Invention

The invention relates to a filter device, in particular a liquid filter, such as a urea filter or fuel filter, having a filter element that is disposed in a filter housing, and having a heater for heating a medium flowing through the filter device.

2. Description of the Prior Art

At low operating temperatures, many known filter devices require a heater, since the viscosity of the media to be filtered in them increases at low temperatures, making passage of the medium through the associated filter element more difficult. In diesel fuel filters, for instance, in cold starting of the associated engine, problems can arise if the outdoor temperature is below the so-called CFPP (cold filter plugging point) of the fuel. In urea filters as well, such a heater may be necessary.

The heaters used are embodied as electrical PTC (positive temperature coefficient) heaters, which have automatic regulation and are especially adapted to the heating situation to be brought about. The PTC elements, however, are comparatively expensive to procure and to process.

In some applications of filter devices, their installation space is severely limited. For such applications, in the case of fuel filters, which have a filter housing with a housing cup and a housing cap, it is known to embody the heater in the housing cap or as a heating rod that protrudes into the clean side of the filter device. However, both versions are comparatively complex and expensive and make additional adaptations to the components necessary.

OBJECT AND SUMMARY OF THE INVENTION

The object of the invention is to furnish a filter device in which the aforementioned problems are overcome, and in particular in which high heating capacity can be furnished economically.

According to the invention, a filter device is created, having a filter element that is disposed in a filter housing, and having a heater for heating a medium flowing through the filter device, in which the heater is disposed in the interior of the filter housing and is mounted on the filter element.

Moreover according to the invention, a filter device, in particular of the type referred to above, is created, having a filter element that is disposed in a filter housing, and having a heater for heating a medium flowing through the filter device, in which the heater is disposed in the interior of the filter housing and is embodied as a component that is separate from the filter housing.

An important advantage of the embodiments according to the invention is that the heater of the invention in the interior of the filter housing leads to especially uniform distribution of the thermal energy supplied, beyond the surface area of the heater itself. At the same time, the heater of the invention and thus the entire filter device requires especially little installation space, while providing high heating output. At the same time, the temperature sought in all the essential filter regions is in particular attained quite quickly and largely uniformly.

Filter housings of known filter devices are as a rule embodied with a housing cup and with a housing cap closing the housing cup. Moreover, the embodiment according to the invention has the advantage that it can furnish heating of the medium for a filter device in the least possible installation space. The embodiment according to the invention, in such filter devices, is suitable both for metal housing cups and plastic housing caps, since the heater is disposed in a separate part inside the housing cup, or in other words independently of the housing cup.

Preferably, in the filter device of the invention, the heater is embodied with at least one heating track. In contrast to known filter devices, in which the heater is provided with PTC elements, a heating track or heating wire or even a heating coil is preferably provided. This embodiment is in particular more economical, for comparable heating output, than embodiments with PTC elements.

The heating track of the invention is especially advantageously embodied as a stamped grating, which in a manner similar to known conductor tracks is stamped out from a striplike or sheetlike piece of sheet metal. The stamped grating (especially in the grid portions separate from the actual heater) may also include further electrical functions, such as supplying current to the associated filter device or diverting current from it. The heating track and the stamped grating are preferably injection-molded into a heating track housing. The injection-molding process to be provided can build on extensive knowledge and experience with other components that in the most various kinds of technical equipment are now being injection-molded into housings made in particular from plastic.

Since the heating track housings according the invention (unlike PTC heating elements) are as a rule not self-regulating, these heating tracks should be provided with their own regulator, in the form of a control device for the controlled delivery of electrical energy to the at least one heating track. This kind of control device may be embodied for instance with pulse width modulation or some other electronic circuit with which overheating of the filter device of the invention is reliably prevented.

The heating track housing provided according to the invention protects against mechanical damage and moreover maintains a spacing between the heating track and the optionally metal filter housing.

The transfer of thermal energy to the medium flowing through the filter device of the invention can moreover be improved by providing that the heating track housing is made from a highly thermally conductive plastic. For generating especially good thermal conductivity, this plastic is advantageously embodied with fillings of aluminum oxide and/or magnesium hydroxide.

These advantages in terms of especially good utilization of the heating energy supplied and the creation of a temperature profile that is especially responsive to need beyond the surface of the filter housing of the invention can moreover be achieved to a particular extent by providing that the at least one heating track is distributed in the form of a loop within the surface of the heating track housing.

The object of the invention is also attained with a filter device, in particular of the inventive type described above, having a filter element that is disposed in a filter housing, and having a heater for heating a medium flowing through the filter device, in which the filter housing is embodied hollow-cylindrically, and the heater, likewise embodied hollow-cylindrically, is disposed in the interior of the filter housing. This embodiment is especially expediently usable for automotive applications, and especially advantageously, the filter element is located essentially in the interior of the hollow-cylindrical heater, and/or the hollow-cylindrical heater can be bathed radially on the inside and outside by the medium that is to be heated. These refinements require only little installation space and nevertheless create an advantageous heat transfer between the heater and the medium to be heated.

The heater of the filter device of the invention is moreover preferably embodied with at least one electrical contact, which is extended out from the material comprising the filter housing. The electrical contacts can then be used in particular for connecting the aforementioned control device, for communication with one or more temperature sensors, and/or for inputting electrical energy.

In the filter device of the invention, the electrical contact is moreover embodied from a different material from the heating track. In these refinements, the heating track is preferably made from a high-impedance material, and the electrical contact is made from a low-impedance material. Such different materials for the heating track and the electrical contact are adapted to the functions associated with the various elements. Hence as the material for the electrical contacts, CuSn is preferably selected, while conversely the heating track is made especially from a material with high electrical resistance that can be stamped out especially well. The material comprising the electrical contact may be connected to the heating track in particular by means of a clamping, stamping, crimping, or soldering process. These embodiments make it possible in particular for a plug, of the kind already available on the market and as rule standardized, to be connected to the heating track of a heater of a filter device. The aforementioned electrical contacts, which are coupled according to the invention to the heating track and embodied from a different material, can in fact be freely selected not only with regard to their shape and size but also with regard to their material and can be adapted accordingly to the specifications of a standardized plug.

The electrical contact is advantageously formed by the heater via a clamping connection with a component of the filter housing, on which component an externally accessible electrical terminal is provided. The clamping connection can be embodied economically during assembly of the heater of the invention on the component of the filter housing, in particular on a housing cap of the filter housing. The electrical terminal is preferably embodied in the form of an either directly connected or plugged-in cable, and the cable can be plugged together with plug pins by means of which the aforementioned clamping connection is also embodied.

BRIEF DESCRIPTION OF THE DRAWINGS

The invention will be better understood and further objects and advantages thereof will become more apparent from the ensuing detailed description of preferred embodiments, taken in conjunction with the drawings, in which.

DESCRIPTION OF THE PREFERRED EMBODIMENTS

Figure 1:
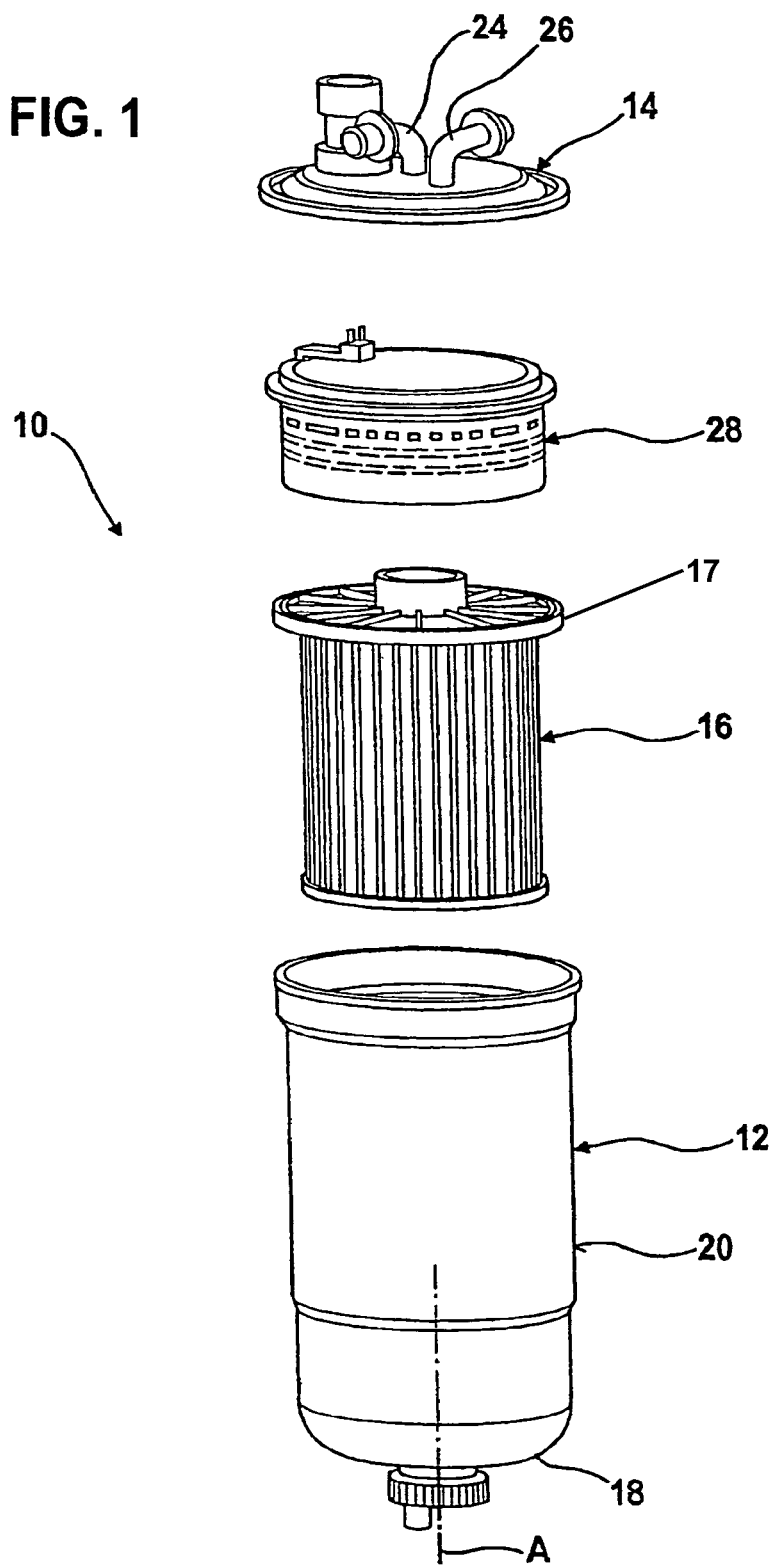
FIG. 1 is an exploded view of one exemplary embodiment of a filter device according to the invention with the following group of components: housing cap, heater, filter element, and housing cup.
Figure 2:
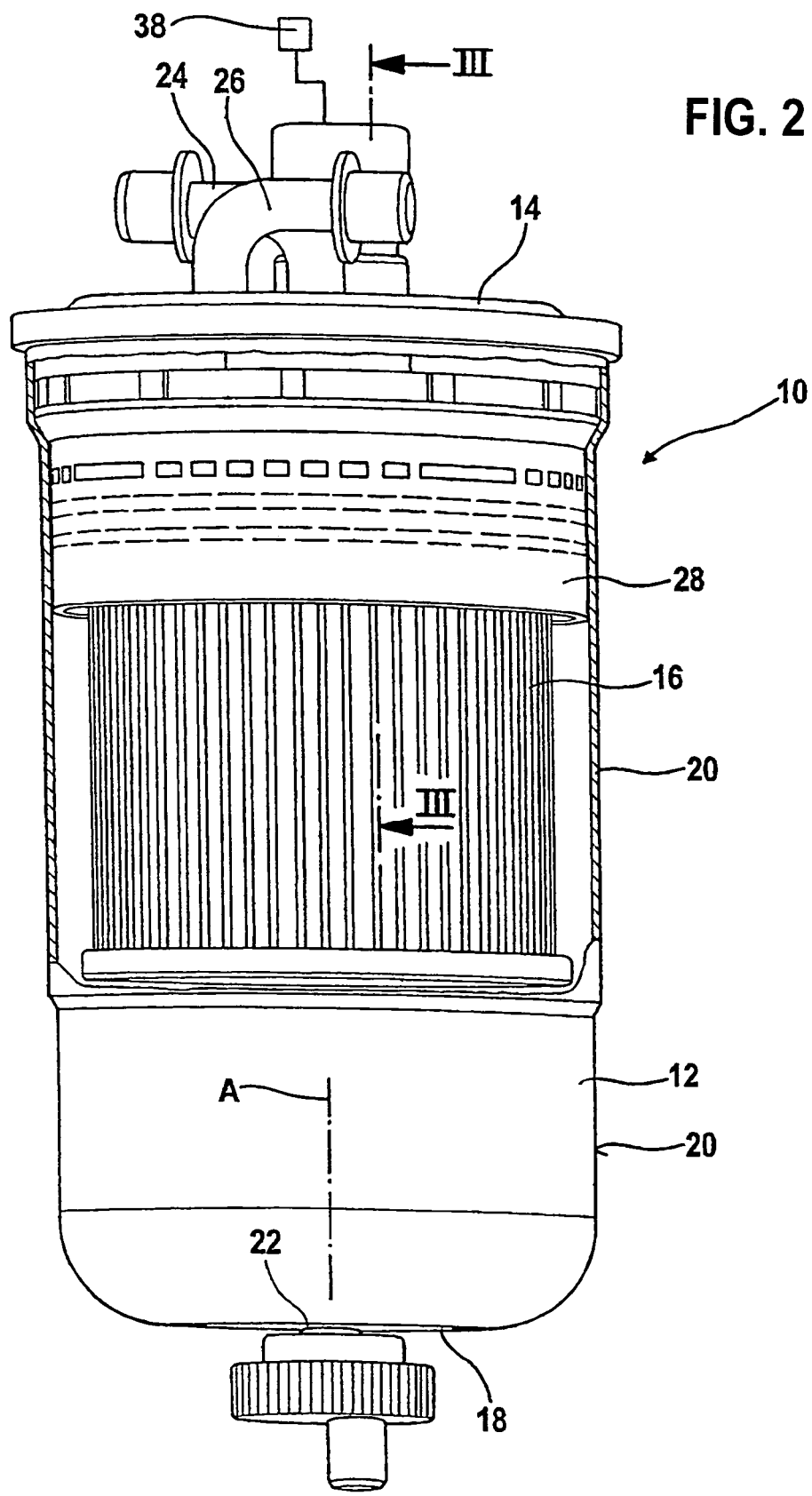
FIG. 2 is a side view of the filter device of FIG. 1, with the housing cup shown broken open.
Figure 3:
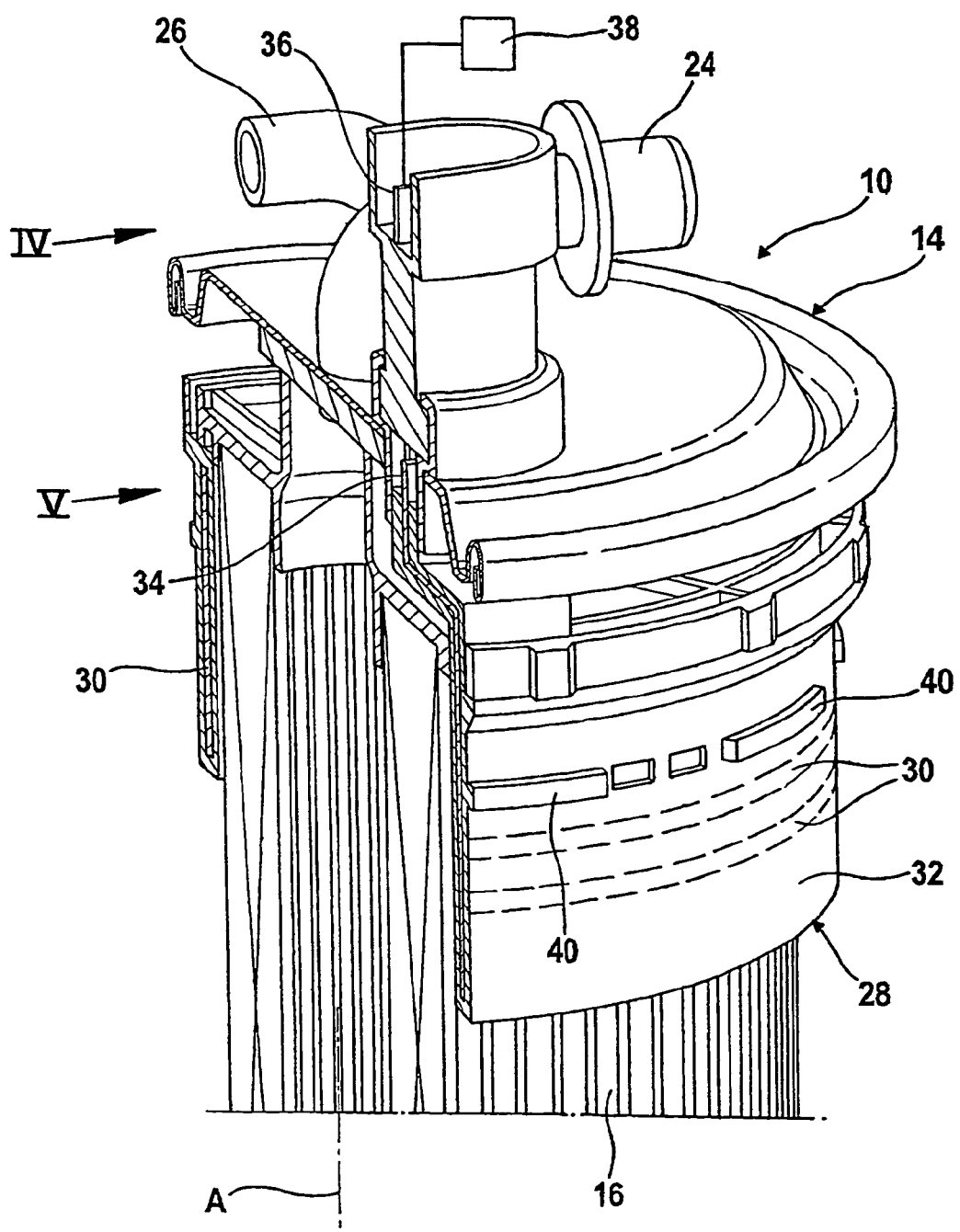
FIG. 3 is a fragmentary sectional view taken along the line III-III in FIG. 2, in perspective.
Figure 4:
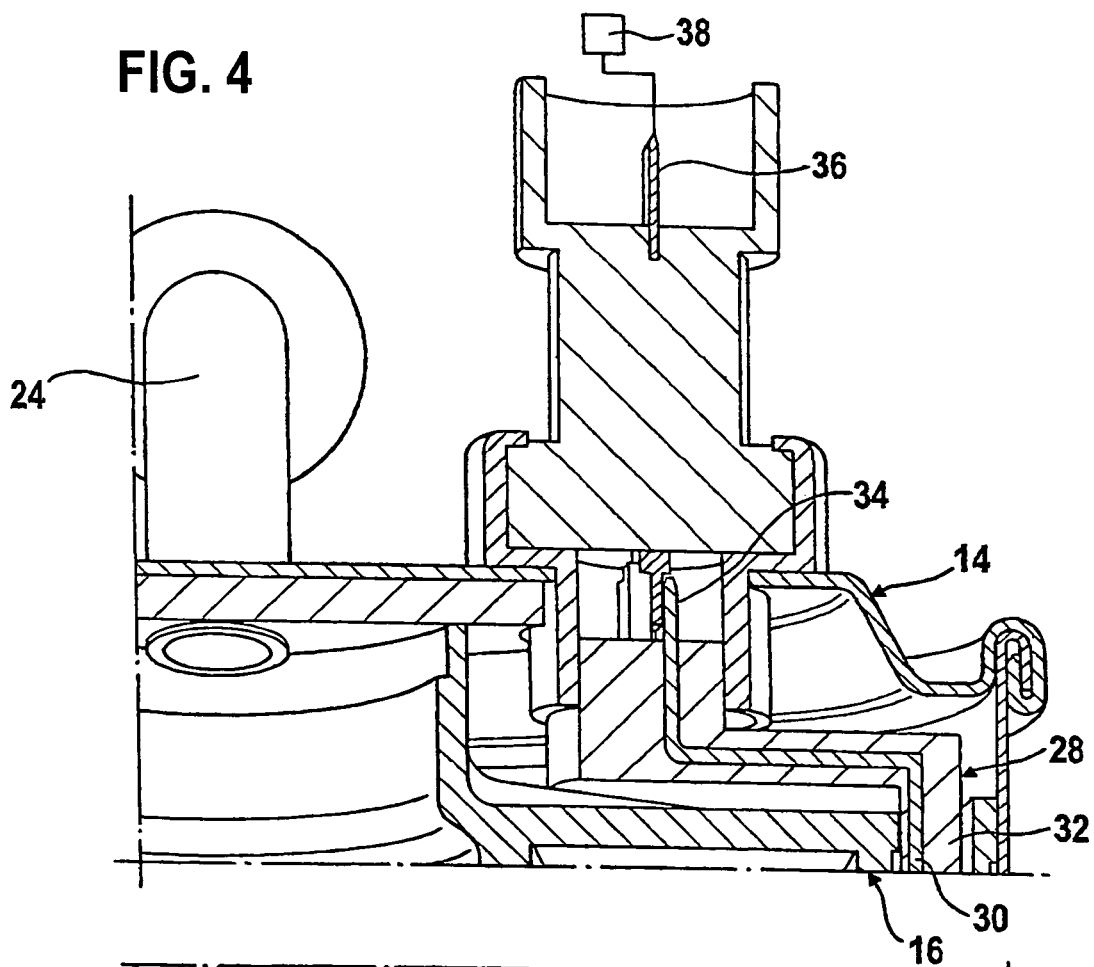
FIG. 4 shows the detail IV in FIG. 3 in a side view.
Figure 5:
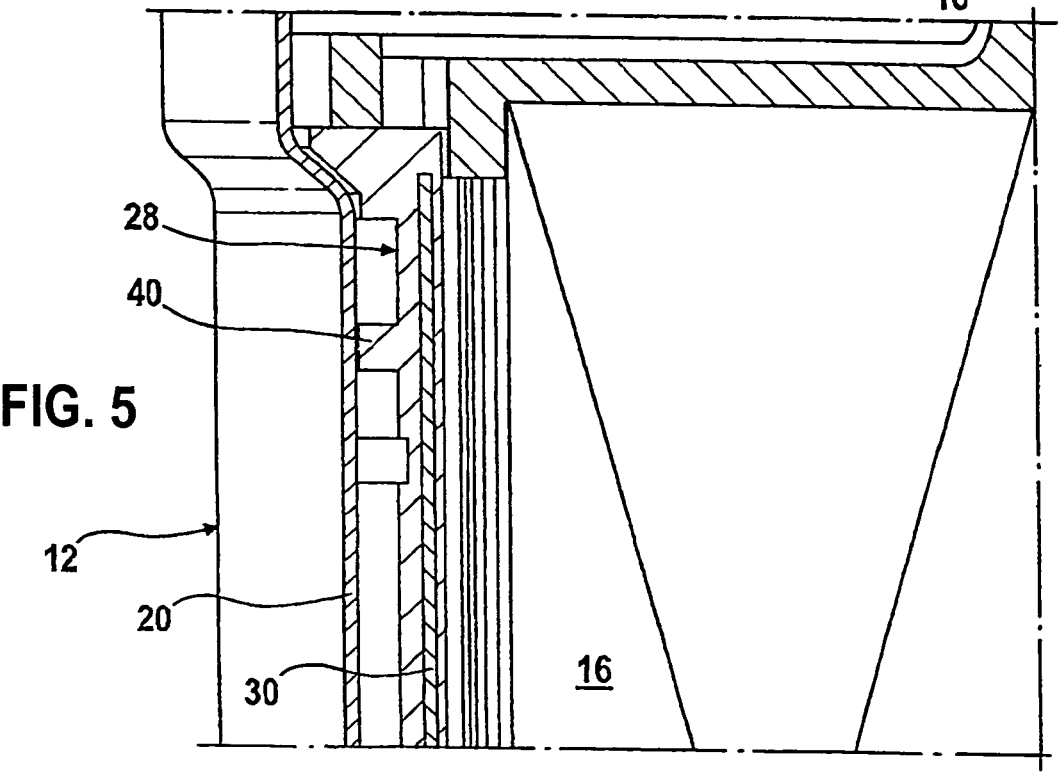
FIG. 5 shows the detail V in FIG. 3, in a side view.

In the drawings, a filter device 10 is show, which as its fundamental components has a filter housing, composed of a housing cup 12 and a housing cap 14, and a filter element 16 located in the filter housing.

The housing cup 12 is embodied in its basic shape as a pot or cup, which includes a housing bottom 18 and an annular wall 20 adjoining the bottom on the circumference. The annular wall 20 is embodied essentially cylindrically about a longitudinal axis A. The housing bottom 18 is penetrated centrally by a through opening 22, which is used for connecting a sensor, not shown. Diametrically opposite, a connection 24 is embodied centrally in the housing cap 14. In operation of the filter device 10, a fluid or medium, such as fuel or urea, is introduced through connection 24 and subsequently passes from radially inside radially outward through the filter element 16 and leaves the filter device 10 through a connection 26.

So that at especially low operating temperatures at the filter device 10 flaking, in particular, or freezing of the filtered fluid will not occur in or at the filter element 16, a hollow-cylindrical heater 28 is disposed below the housing cap 14, in terms of the drawings, between the annular wall 20 of the housing cup 12 and the outer jacket face of the cylindrical filter element 16. The filter 16 includes a projection portion 17, also known as an end cap, which is disposed at one end of the outer jacket face of the cylindrical filter 16.

In this heater 28, the heat generation is effected by means of a heating track 30 laid in loops, through which electrical current can be conducted. The loops of the heating track 30 are cut out, in the form of a so-called stamped grating, from a sheet-metal strip by means of a stamping process, and after a bending operation they are insert-molded with a heat-conducting material 32 in the form of a heating track housing. In this way, the overall hollow-cylindrical shape of the heater 28 and of the heating track housing is formed. The heating track 30 is distributed over the jacket face of the hollow cylinder in such a way that a large-area and simultaneously uniform input of thermal energy into the heat-conducting material 32 and thus into the fluid flowing around it occurs.

In the process of injection-molding the thermally conducting material 32, two contact points 34 on the heating track 30 have also been extended out of the heat-conducting material 32 in such a way that they are connectable to plug pins 36. The plug pins 36 are injection-molded in the housing cap 14 and are clamped to the contact points 34 upon mounting of the heater 28 on the housing cap 14. In the built-in state of the filter device 10, a control device 38, shown only highly simplified, for delivering and regulating electrical current to the heating track 30 is then connected to the plug pins 36.

The heater 28, thus preassembled on the housing cap 14, protrudes in the assembled state from the outside of the filter element 16 into the housing cup 12 and is kept spaced apart from the inside of the housing cup 12 by means of ribs 40.

The foregoing relates to preferred exemplary embodiments of the invention, it being understood that other variants and embodiments thereof are possible within the spirit and scope of the invention, the latter being defined by the appended claims.

We claim:

1. A filter device comprising:
a filter housing defining an interior housing space to receive a flow of medium,
a heater to heat the flow of medium, the heater being disposed in the interior housing space, the heater including a hollow cylindrical housing having (i) an inside surface defining an interior heater space, and (ii) an outside surface facing the filter housing, a housing cap having an inlet to direct the medium to the interior housing space and an outlet to direct the medium away from the interior housing space; and a filter element disposed at least partially in the interior heater space to filter the flow of medium in the interior housing space, wherein the heater is arranged in the interior housing space between the housing cap and the filter housing so that both the inside surface and the outside surface of the hollow cylindrical housing are bathed by the flow of medium in the interior housing space, and wherein the heater includes at least one electrical contact.

2. The filter device as defined by claim 1, wherein the hollow cylindrical housing includes a heat conducting material and the heater includes at least one heating track disposed in the hollow cylindrical housing.

3. The filter device as defined by claim 2, wherein the at least one heating track is formed by a metal stamped grating.

4. The filter device as defined by claim 3, wherein the at least one heating track is injection-molded in the hollow cylindrical housing.

5. The filter device as defined by claim 3, wherein the at least one heating track is distributed in loop form within a structure of the hollow cylindrical housing.

6. The filter device as defined by claim 2, wherein the at least one heating track is injection-molded in the hollow cylindrical housing.

7. The filter device as defined by claim 6, wherein the at least one heating track is distributed in loop form within a structure of the hollow cylindrical housing.

8. The filter device as defined by claim 7, wherein the at least one electrical contact extends out from the filter housing.

9. The filter device as defined by claim 2, wherein the at least one heating track is distributed in loop form within a structure of the hollow cylindrical housing.

10. The filter device as defined by claim 2, wherein the at least one electrical contact extends out from the filter housing.

11. The filter device as defined by claim 1, wherein the at least one electrical contact extends out from the filter housing.

12. The filter device as defined by claim 1, wherein the electrical contact comprises a clamping connection clamped with a component of the filter housing, on which component an externally accessible electrical terminal is provided.

13. The filter device as defined by claim 1, wherein:
the heater further includes a plurality of ribs that extend from the outside surface of the hollow cylindrical housing, and
the plurality of ribs is located between an interior surface of the filter housing and the outside surface of the hollow cylindrical housing.

14. The filter device as defined by claim 13, wherein each of the plurality of ribs that extend from the outside surface of the heater include a space defined therebetween.

15. The filter device as defined by claim 1 wherein the hollow cylindrical housing includes a length extending along an axial direction of the filter housing, the length being sufficient to extend along a first portion of an inside annular wall of the filter housing having a first length and insufficient to extend along a second portion of the inside annular wall of the filter housing having a second length wherein fluid between an outer jacket face of the filter element and an inside annular wall of the filter housing is unobstructed by the hollow cylindrical housing along the second portion.

16. The filter device as defined by claim 15 wherein the first length of the first portion of the inside annular wall of the filter housing is less than the second length of the second portion of the inside annular wall of the filter housing.

17. The filter device as defined by claim 1 wherein the housing cap includes a plug pin formed in the housing cap to contact the at least one electrical contact, wherein contact between the plug pin and the at least one electrical contact provides for the delivery of current from the plug pin to the heater.

18. The filter device as defined by claim 17 wherein the at least one electrical contact includes a contact point connectable to the plug pin upon mounting of the heater on the housing cap.

19. The filter device as defined by claim 18 wherein the heater includes at least one heating track disposed in the hollow cylindrical housing, wherein the at least one heating track extends from the hollow cylindrical housing to provide the contact point.

20. A filter device comprising:
a filter housing including a housing cap and a housing cup, the housing cup defining an interior housing space to receive a flow of fluid, wherein the housing cap includes an inlet an inlet to direct the medium to the interior housing space and an outlet to direct the medium away from the interior housing space,
a heater to heat the flow of fluid, the heater being disposed in the interior housing space, the heater including a hollow cylindrical housing having (i) an inside surface defining an interior heater space, and (ii) an outside surface facing the housing cup, and
a filter element to filter the flow of fluid, the filter element being disposed at least partially in the interior heater space,
wherein the heater is mounted on the housing cap so that when the housing cap and housing cup are assembled together the hollow cylindrical housing is positioned on the outside of the filter element and protrudes into the housing cup, and wherein the heater has at least on electrical contact which extends out from the filter housing,
wherein the hollow cylindrical housing further includes a plurality of ribs extending from the outside surface thereof, and
wherein the plurality of ribs are interposed between the outside surface of the heater and an interior surface of the housing cup so that the heater is kept spaced apart from the housing cup by the plurality of ribs.

21. The filter device as defined by claim 20 wherein the hollow cylindrical housing includes a length extending along an axial direction of the filter housing, the length being sufficient to extend along a first portion of an inside annular wall of the filter housing having a first length and insufficient to extend along a second portion of the inside annular wall of the filter housing having a second length wherein fluid between an outer jacket face of the filter element and an inside annular wall of the filter housing is unobstructed by the hollow cylindrical housing along the second portion.

22. The filter device as defined by claim 21 wherein the first length of the first portion of the inside annular wall of the filter housing is less than the second length of the second portion of the inside annular wall of the filter housing.

23. A filter device comprising:
a filter housing defining an interior housing space to receive a flow of medium,
a heater to heat the flow of medium, the heater being disposed in the interior housing space, the heater including a hollow cylindrical housing having (i) an inside surface defining an interior heater space, (ii) an outside surface facing the filter housing, and (iii) at least one heating track formed by a metal stamped grating;

a housing cap having an inlet to direct the medium to the interior housing space and an outlet to direct the medium away from the interior housing space; and a filter element disposed at least partially in the interior heater space-to filter the flow of medium in the interior housing space, wherein the heater is arranged in the interior housing space between the housing cap and the filter housing so that both the inside surface and the outside surface of the hollow cylindrical housing are bathed by the flow of medium in the interior housing space, and wherein the heater has at least one electrical contact.

* * * * *